United States Patent
Fukura et al.

[11] Patent Number: 6,109,782
[45] Date of Patent: Aug. 29, 2000

[54] INFRARED THERMOMETER

[75] Inventors: Masashi Fukura; Takanobu Yamauchi; Akira Nakagawa; Shigeru Makita, all of Nagaokakyo, Japan

[73] Assignee: Omron Corporation, Kyoto, Japan

[21] Appl. No.: 09/091,955

[22] PCT Filed: Dec. 25, 1996

[86] PCT No.: PCT/JP96/03785

§ 371 Date: Jun. 26, 1998

§ 102(e) Date: Jun. 26, 1998

[87] PCT Pub. No.: WO97/24588

PCT Pub. Date: Jul. 10, 1997

[30] Foreign Application Priority Data

Dec. 28, 1995 [JP] Japan .................................. 7/342141

[51] Int. Cl.⁷ .................................. G01K 1/00; G01J 5/00
[52] U.S. Cl. .................................. 374/131; 374/209; 374/208
[58] Field of Search .................................. 374/131, 130, 374/209, 208

[56] References Cited

U.S. PATENT DOCUMENTS

| | | | |
|---|---|---|---|
| Re. 34,789 | 11/1994 | Fraden | 364/557 |
| 4,797,840 | 1/1989 | Fraden | 364/557 |
| 4,895,164 | 1/1990 | Wood | 128/736 |
| 5,066,142 | 11/1991 | DeFrank et al. | 374/131 |
| 5,127,742 | 7/1992 | Fraden | 374/129 |
| 5,163,418 | 11/1992 | Fraden et al. | 128/9 |
| 5,178,464 | 1/1993 | Fraden | 374/129 |
| 5,293,877 | 3/1994 | O'Hara et al. | 374/131 |
| 5,368,038 | 11/1994 | Fraden | 374/131 |
| 5,487,607 | 1/1996 | Makita et al. | 374/209 |
| 5,628,323 | 5/1997 | Pompei | 374/130 |
| 5,645,349 | 7/1997 | Fraden | 374/120 |
| 5,795,067 | 8/1998 | Fraden et al. | 374/158 |

FOREIGN PATENT DOCUMENTS

| | | |
|---|---|---|
| 3-202733 | 9/1991 | Japan . |
| 5-045229 | 2/1993 | Japan . |
| 5-203499 | 8/1993 | Japan . |
| 6-000165 | 1/1994 | Japan . |
| 7-155296 | 6/1995 | Japan . |
| WO 90/02521 | 3/1990 | WIPO . |
| WO 90/05902 | 5/1990 | WIPO . |

*Primary Examiner*—G. Bradley Bennett
*Assistant Examiner*—Gail Verbitsky
*Attorney, Agent, or Firm*—Morrison & Foerster LLP

[57] ABSTRACT

An infrared thermometer such that the measurand includes no error which may be caused due to the transmission of the heat from an object (especially, an external auditory canal), into which a probe is inserted to the probe, to a waveguide and an infrared sensor. In a temperature detecting section where an infrared sensor (40), a waveguide (60) and a temperature sensor (68) are provided in a probe (20), a second thermally conductive tube (34) is so provided between the probe (20) and the waveguide (60) as to be heat insulated from the waveguide (60) and the infrared sensor (40). Thus, the heat from the probe (20) is not transmitted to the waveguide (60) and the infrared sensor (40).

3 Claims, 4 Drawing Sheets

INFRARED THERMOMETER

TECHNICAL FIELD OF THE INVENTION

The present invention relates to an infrared thermometer for measuring a temperature (e.g. a bodily temperature) by detecting infrared rays radiated from biological surface tissues such as an external auditory canal and tympanic membrane of a human being, in particular to the internal structure of a probe to be inserted into a measured site such as an external auditory canal.

BACKGROUND OF THE INVENTION

Infrared thermometers (clinical thermometers) generally includes probes projected from the casing of the main body of the thermometer so as to be insertable into the external auditory canals of human beings. Waveguides are provided inside the probe to guide the infrared rays radiated from biological surface tissues, such as external auditory canals and tympanic membranes, to infrared sensors.

FIG. 5 shows schematically one example of the internal structures of the probes of infrared thermometers. In this infrared thermometer, the probe 100 is composed of a conical tube hollow inside, and the infrared sensor 104 is provided in the end portion of the probe 110, the end portion having a large diameter and being fixed to the main casing body 102 of the thermometer. One end of the tubular waveguide 106 is fixed to the detecting face of the infrared sensor 104, and the other end of the waveguide 106 is positioned in the vicinity of the tip end of the probe 100 with a small diameter. The temperature sensor 108 measuring the temperature of the infrared sensor 104 is provided on the infrared sensor 104. The infrared sensor 104 and the temperature sensor 108 are included in the casing main body 102, and are connected to the arithmetic operating section 110 operating arithmetically the temperature of an object based on the outputs from the sensors 104 and 108. When measuring a bodily temperature using this thermometer, the probe 100 is put into an external auditory canal 112. The infrared rays radiated from the external auditory canal 112 and the tympanic membrane 114 reach the infrared sensor 104 through the waveguide 106, so that the bodily temperature is computed by the temperature operating section 110 based on the outputs from the infrared sensor 104 and the temperature sensor 108.

When there is a difference in temperature between the waveguide 106 and the infrared sensor 104, the above infrared thermometer causes an error in the measuring result of the infrared sensor 104 due to the difference in temperature. The waveguide 106 is made of a high thermal conductive metal in order to prevent such an error, and its interior wall is usually mirror finished and further plated with gold. In addition, the waveguide 106 is welded at its end to the infrared sensor 104 by heating, without any thermally insulating material between them.

When the probe 100 is inserted into the external auditory canal 112, a part of the outer circumferential surface of the probe 100 is unavoidably put into contact with the external auditory canal 112. At this point of time, the heat of the external auditory canal 112 is transmitted to the probe 100 because the temperature of the probe 100 is usually lower than that of the external auditory canal 112. The heat of the probe 100 is further transmitted to the waveguide 106, raising the temperature of a part of the waveguide 106. As a result, the infrared sensor 104 detects the raised temperature of the part of the waveguide 106, causing an error in the measurement of the bodily temperature.

In order to solve the above problem, Japanese Unexamined Patent Publication No. 61-117422 discloses a method of measuring a temperature in which the probe is preheated to a predetermined reference temperature before measurement of a bodily temperature to thereby prevent the temperature of a part of the waveguide from rising above the temperature of the infrared sensor during the measurement. This method, however, has a problem that the external auditory canal and tympanic membrane become warm by the preheated probe, so that a precise bodily temperature can not be measured. Further, preheating the probe consumes more electric power, so that the service lives of batteries are remarkably decreased, particularly in case of a portable thermometer using batteries.

Japanese Unexamined Patent Publication No. 6-502099 (Japanese Patent Application No. 4-504325) discloses an infrared thermometer comprising an infrared sensor, ambient temperature sensor and waveguide temperature sensor. This infrared thermometer utilizes an object's temperature-conversing method (i.e. calibration mapping) in which the temperatures of the environment and an object are multi-measured when the apparatus is adjusted, and in which the temperature of the object is converted using the outputs from the respective sensors and a temperature-converting equation which has been determined experimentally. This infrared thermometer, however, requires a plural number of temperature sensors with consequently a high production cost, and it requires measurement of a plurality of ambient temperatures for adjusting the apparatus, so that it takes a long time in adjusting the apparatus.

SUMMARY OF THE INVENTION

An object of the present invention is to provide an infrared thermometer which can prevent the heat transmitted from an object (in particular an external auditory canal) to a probe from being transmitted to a waveguide and an infrared sensor, and thereby can measure a bodily temperature more precisely.

In order to achieve the object, an infrared thermometer of the present invention comprises an infrared sensor and a first tube (a waveguide) guiding infrared rays to the infrared sensor inside a probe as the tip end portion of the casing main body of the thermometer, and a second thermal-conductive tube is provided between the probe and the first tube while being thermally insulated from the first tube and the infrared sensor.

According to this infrared sensor, the heat transmitted from an object (for example, an external auditory canal) to the probe is transmitted to the second tube disposed between the probe and the waveguide (the first tube). Since the second tube is thermal-conductive, the heat transmitted from the object to the second tube is dispersed in the second tube. Accordingly, the heat further transmitted from the second tube to the first tube (the waveguide) and the infrared sensor can be minimized. The waveguide and the infrared sensor can also be maintained at the same temperature, and a stable and high-accuracy temperature measurement can be conducted.

In another embodiment of the present invention, a probe is put in contact with at least a part of a second tube. In this embodiment, the heat transmitted from an object to the probe is instantly dispersed to the second tube.

In still another embodiment of the present invention, a heat-releasing section is provided in a second tube. In this embodiment, the heat transmitted from a probe to the second tube is instantly released, and therefore, thermal influence on not only the waveguide and the infrared sensor but also the second tube can be minimized.

DETAILED DESCRIPTION OF THE INVENTION

Figure 1:
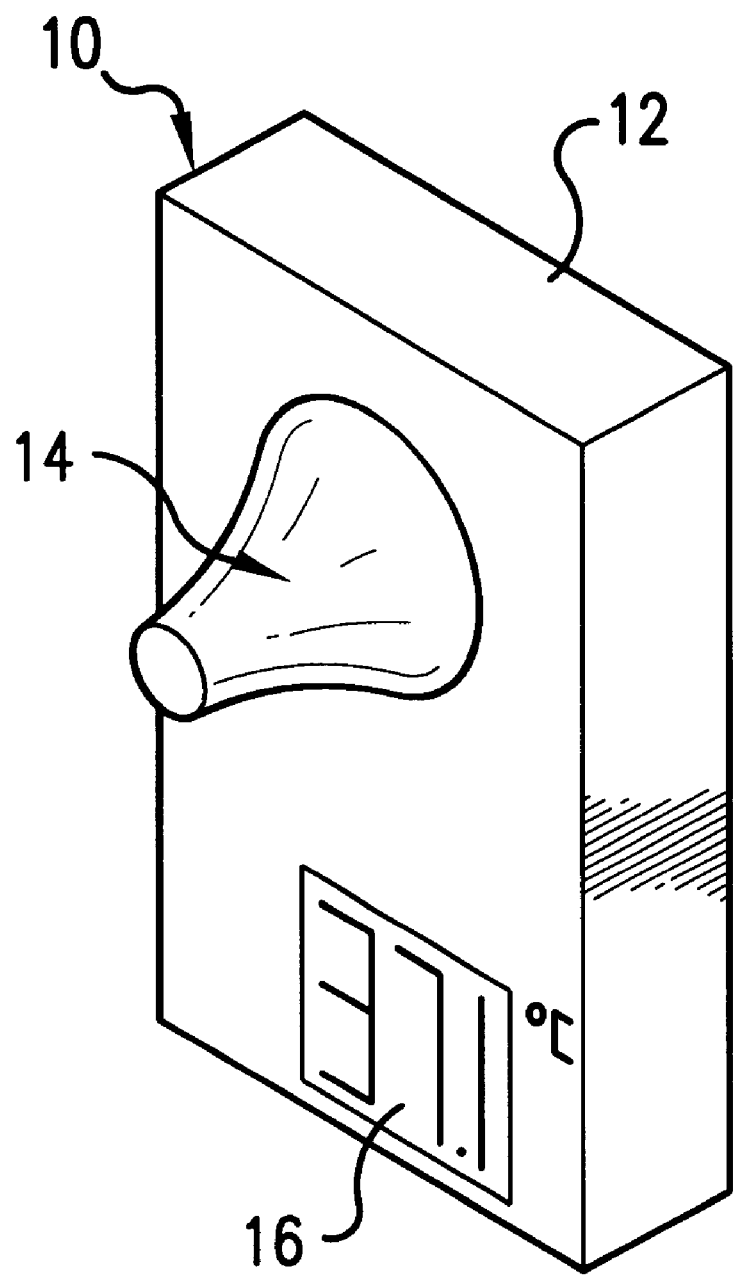
FIG. 1 is a perspective view of the external appearance of an infrared thermometer.

With reference to the accompanying drawings, preferred embodiments of the present invention will be described. FIG. 1 shows the external appearance of an infrared thermometer, wherein the casing main body 12 of the infrared thermometer 10 is provided with a temperature detecting section 14 and a liquid crystal display section 16. The temperature detecting section 14 is projected from the plane of the casing main body 12, forming the tip end portion of the casing main body 12. The liquid crystal display section 16 is provided for displaying a temperature measured by the temperature detecting section 14. Although appearing in the form of a box in FIG. 1, the casing main body 12 may be in the form of any other shape such as a bent cylindrical shape with a temperature detecting section 14 formed as a projected tip end portion, a shape of a pistole, and other suitable shape for the user to hold easily.

Figure 2:
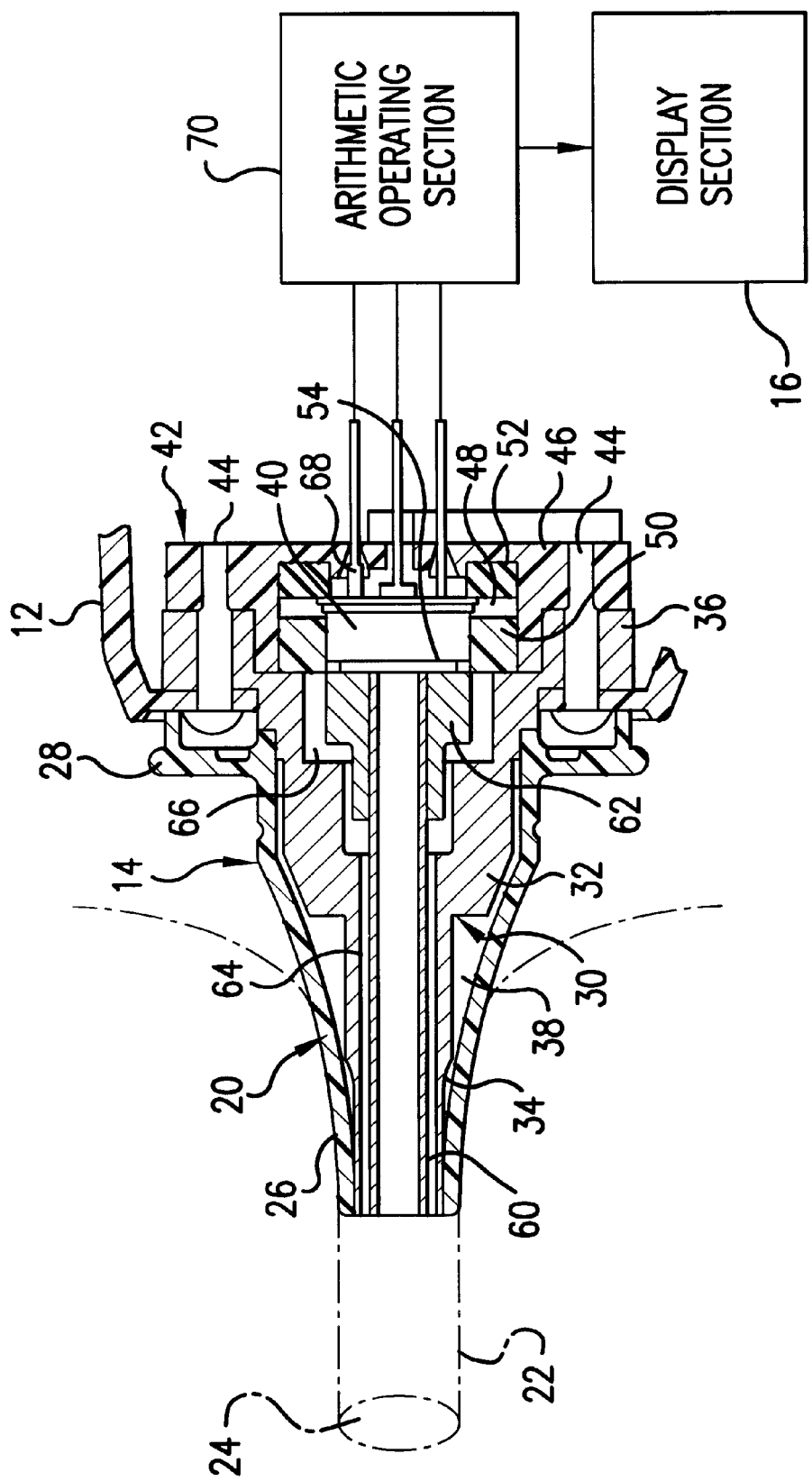
FIG. 2 is a sectional view of the temperature detecting section of an infrared thermometer of the present invention.

FIG. 2 is a sectional view of the temperature detecting section 14. The temperature detecting section 14 comprises a probe 20. The probe 20 is formed integrally of a synthetic resin, and it comprises a cylindrical portion 26, hollow inside, in the form of, for example, a cone which is suitably sized to be inserted into an external auditory canal 22 of a human being; and a flange portion 28 extending radially and outwardly from the base end portion of the cylindrical portion 26 with a large diameter. The probe 20 is held fixedly at the flange portion 28 to the casing main body 12.

A heat-diffusing sleeve 30 is disposed coaxially inside the probe 20. The heat-diffusing sleeve 30 comprises a cylindrical heat-releasing portion 32 positioned at the base end portion of the cylindrical portion 26 of the probe 20; a cylindrical heat-transmitting portion 34 (a second tube) extending from one end of the heat-releasing portion 32 to the vicinity of the tip end of the probe 20; and a flange portion 36 extending radially and outwardly from the base end portion of the heat-releasing portion 32. The heat-releasing portion 32, the heat-transmitting portion 34 and the flange portion 36 are formed integrally. The heat-diffusing sleeve 30 is formed of a metal with a large heat conductivity such as copper, aluminum and brass so that the heat transmitted from the probe 20 can be instantly diffused and released. The outer circumferential surface of the heat-diffusing sleeve 30 is kept away from the interior circumferential surface of the probe 20 to form a heat-insulating space 38 therebetween so as to reduce the heat-transmission from the probe 20. The outer circumferential surface of the tip end portion of the heat-transmitting portion 34 is in contact with the interior face of the probe 20 so that the heat of the probe 20 can be instantly transmitted to the heat-transmitting portion 34 and diffused therein.

A sensor housing 42 fixedly holding an infrared sensor 40 is provided in the heat-diffusing sleeve 30. The sensor housing 42 is formed of a synthetic resin, preferably a synthetic resin with a heat conductivity as low as possible. The sensor housing 42 is provided with an outer casing 46 secured together with the heat-diffusing sleeve 30 to the casing main body 12 of the thermometer by screws 44. A sensor housing chamber 48 is formed in the outer casing 46. The infrared sensor 40 and an inner casing 50 fitted around the infrared sensor 40 are fitted in the sensor housing chamber 48. An elastic rubber 52 is used to energize the infrared sensor 40 and the inner casing 50 toward the heat-diffusing sleeve 30 so as to fixedly hold the infrared sensor 40.

There is also provided in the heat-diffusing sleeve 30 a waveguide 60 composed of a metallic cylindrical tube extending from the detecting face 54 of the infrared sensor 40 to the tip end of the probe 20. The waveguide 60 is held fixedly at its one end portion by a metallic block 62 in the vicinity of the infrared sensor 40. The metallic connector 62 is fixed to the detecting face 54 of the infrared sensor 40 by welding or by the use of adhesive so as to position the waveguide 60 coaxially with the probe 20 and the heat-diffusing sleeve 30. The waveguide 60 is kept away from the heat-diffusing sleeve 30 to form a heat-insulating space 64 therebetween. The metallic connector 62 is likewise kept away from the heat-diffusing sleeve 30 to form a heat-insulating space 66 therebetween.

A temperature sensor 68 (a thermistor) is fixed on the infrared sensor 40 with adhesive. The temperature sensor 68 is connected to the arithmetic operating section 70, so that temperature data of the infrared sensor 40 detected by the temperature sensor 68 is outputted to the arithmetic operating section 70. The infrared sensor 40 is likewise connected to the arithmetic operating section 70, so that temperature data detected by the infrared sensor 40 is outputted to the arithmetic operating section 70. As seen in the drawing, a plural number of openings are provided in the outer casing 46, and preferably, the leads of the sensors 40 and 68 are drawn out through such openings.

When measuring a bodily temperature using this thermometer 10, the operator holds the casing main body 12 by the hand, and inserts the probe 20 into the external auditory canal 22 of a patient or his as shown in FIG. 2. The infrared rays radiated from the external auditory canal 22 and the tympanic membrane 24 are led to the waveguide 60 so as to be detected by the infrared sensor 40. The infrared sensor 40 outputs signals corresponding to the intensities of the infrared rays to the arithmetic operating section 70. The arithmetic operating section 70 computes the bodily temperature based on the outputs from the infrared sensor 40 and the temperature sensor 68, and the computed result is displayed on the display section 16.

In the process of detecting the bodily temperature, it is unavoidable for the probe 20 once inserted to be put into contact with the external auditory canal 22 as shown in FIG. 2. The temperature of the probe 20 is usually lower than the bodily temperature, so that the heat of the external auditory canal 22 is transmitted to a part of the probe 20 (generally on the side of the tip end of the probe) in contact with the external auditory canal 22.

The heat is transmitted to the heat-transmitting portion 34 of the heat-diffusing sleeve 30 in contact with the probe 20, and further to the heat-releasing portion 32 thereof. The heat-releasing portion 32 is formed having a larger volume for a larger heat capacity as compared with the heat-transmitting portion 34. The heat in the heat-transmitting portion 34 is therefore instantly transmitted to the heat-releasing portion 32. On the other hand, the heat-diffusing sleeve 30 is thermally insulated from the waveguide 60 due to the presence of the heat-insulating space 64, so that the heat in the heat-diffusing sleeve 30 is not transmitted to the waveguide 60. Further, the metallic connector 62 is fitted around the end portion of the waveguide 60 in the vicinity of the infrared sensor 40, and the metallic connector 62 is also thermally insulated from the heat-diffusing sleeve 30 due to the presence of the heat-insulating space 66, so that the heat in the heat-releasing portion 32 of the heat-diffusing sleeve 30 is not transmitted to the infrared sensor 40 or the waveguide 60. The waveguide 60 is therefore kept at the same temperature as that of the infrared sensor 40. Thus, there is no fear of causing an error in measurement of a bodily temperature because of the influence of an increased temperature of the waveguide 60 which is partially heated.

In this embodiment, the waveguide 60 is held fixedly on the infrared sensor 40 through the metallic connector 62. Otherwise, the waveguide 60 may be welded to the infrared sensor 40 by heating the end portion of the waveguide 60, or a disc-shaped flange is formed integrally with the end portion of the waveguide 60 so that the waveguide 60 may be held fixedly on the infrared sensor 40 through this flange.

Figure 3:
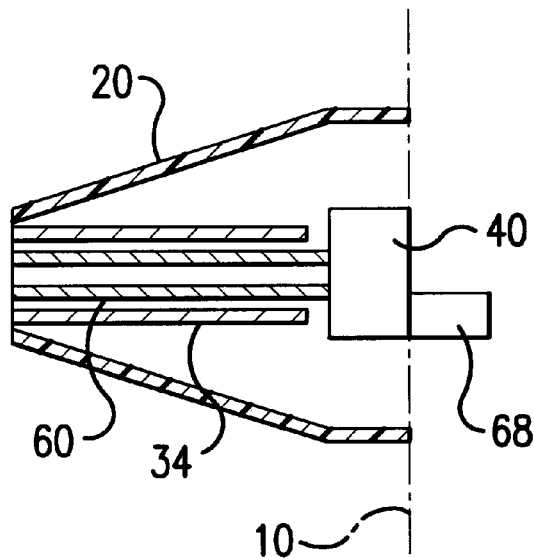
FIG. 3 is a schematic sectional view of another embodiment of the present invention.

Also in this embodiment, a part of the heat-transmitting portion 34 of the heat-diffusing sleeve 30 is put into contact with the probe 20. The waveguide 60, however, may be entirely kept away from the probe 20 as schematically shown in FIG. 3, or otherwise, the entire outer circumferential surface of the heat-transmitting portion 34 may be kept in contact with probe 20.

Figure 4:
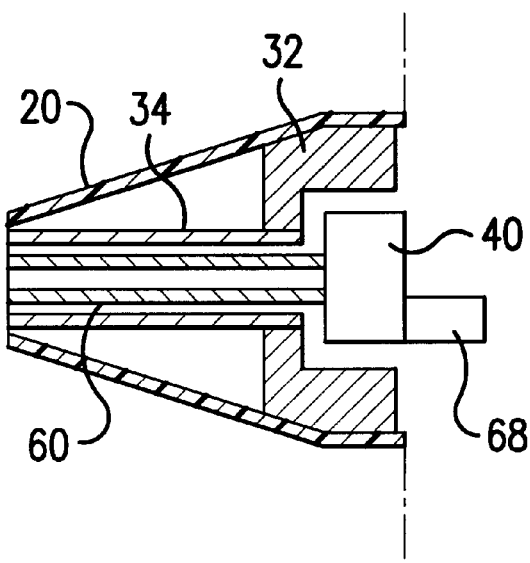
FIG. 4 is a schematic sectional view of other embodiment of the present invention.
Figure 5:
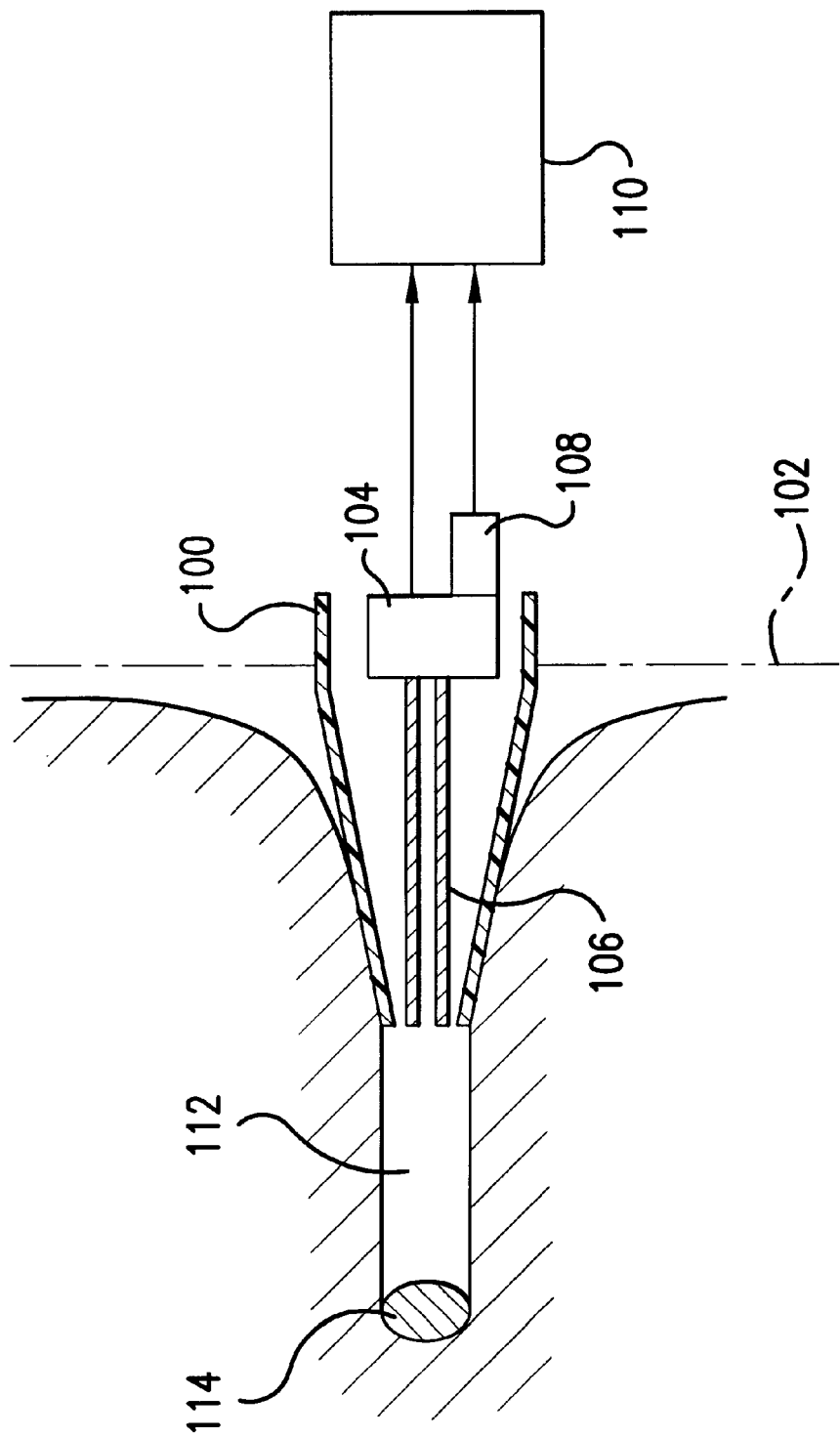
FIG. 5 is a schematic sectional view of the probe of an infrared thermometer according to the prior art, illustrating the internal structure of the probe.

Further, in this embodiment, the heat-transmitting portion 34 is formed integrally with the heat-releasing portion 32. These portions, however, may be formed separately and then assembled to construct the heat-diffusing sleeve 30 as shown in FIG. 4.

As is understood from the above description, according to the infrared thermometer of the present invention, the second thermal-conductive tube is provided between the probe and the waveguide (the first tube) with being thermally insulated from the first tube and the infrared sensor, and therefore, the heat transmitted from an object to the probe is transmitted to the second tube, so that the heat conduction to the waveguide and the infrared sensor can be minimal. The waveguide and the infrared sensor, therefore, can be maintained at the same temperature, so that a stable temperature measurement can be conducted. Therefore, the measuring accuracy is improved.

Also, the probe is allowed to be put into contact with a part of the second tube, so that the heat transmitted from the object to the probe is instantly transmitted to the second tube.

Also, the second tube is provided with the heat-releasing portion to thereby instantly release the heat transmitted from the probe to the second tube, so that thermal influences on not only the waveguide and the infrared sensor but also the second tube can be minimized.

What is claimed is:

1. An infrared thermometer, comprising:

a waveguide guiding infrared rays to an infrared sensor inside a probe formed as the projected tip end portion of a casing main body of the infrared thermometer; and a heat-conductive tube provided between said probe and said waveguide, diffusing the heat from the probe and being thermally insulated from the waveguide and the infrared sensor.

2. An infrared thermometer according to claim 1, wherein said probe and said heat conductor are in contact with each other in at least one part.

3. An infrared thermometer according to claim 1, wherein said heat conductive tube comprises a heat-releasing portion.

\* \* \* \* \*